March 3, 1964    L. D. KLEISS    3,123,086
ANALOG PROCESS CONTROL
Filed April 9, 1962    2 Sheets-Sheet 1

INVENTOR.
L. D. KLEISS
BY Young & Quigg
ATTORNEYS

United States Patent Office 3,123,086
Patented Mar. 3, 1964

3,123,086
ANALOG PROCESS CONTROL
Louis D. Kleiss, Borger, Tex., assignor to Phillips
Petroleum Company, a corporation of Delaware
Filed Apr. 9, 1962, Ser. No. 186,239
15 Claims. (Cl. 137—4)

This invention relates to automatic control mechanisms and method of utilizing same in the control of systems having dead time and exponential lag.

Dead time in a system is the time elapsing between the initiation of a corrective action in the system and the detection of the effect of the corrective action upon the system. For example, in a system concerned with maintaining a constant temperature in a fluid flowing in a pipe where the application of heat to the pipe is at a distance upstream of the temperature measuring device, the dead time of the system is the time required for the heated fluid to move from the heat source to the point where the temperature increase is detected. This dead time may be a matter of seconds or hours, depending upon the length of pipe between the heat source and the temperature measuring device and the velocity of fluid in the pipe. Insertion of a large tank in the pipe between the aforementioned points will additionally increase the dead time.

Exponential lag is the term which is applied to the gradual change in temperature such as that detected by the temperature sensing device in response to an abrupt or "step" change in the heat input to the pipe. This is the result of mixing of warm and wool fluid within the pipe.

Figure 1:
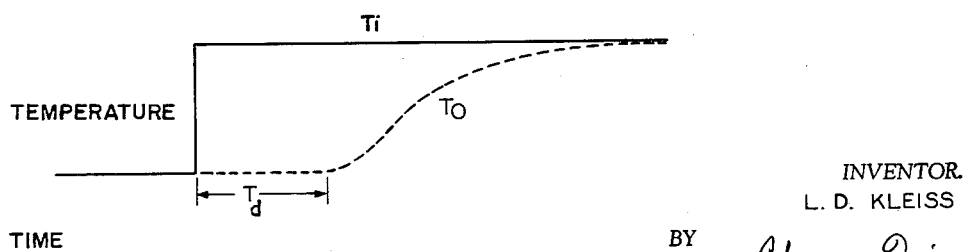

A typical overall effect of dead time plus exponential lag upon the detected temperature in response to a change in heat application in the pipe example is depicted by FIGURE 1. The step shaped line $T_i$ represents a step change in the fluid temperature input to the pipe and $T_o$ represents the temperature response detected by the temperature sensing device. $T_d$ is dead time of the system. The exponential part of the $T_o$ curve is the result of the exponential lags of the system. A change in the temperature input to the pipe will not be detected by the temperature sensing device until after dead time $T_d$ and the temperature will then increase gradually, then more rapidly, and finally level off in an asymptotic approach to the $T_i$ input line.

All automatic control systems are characterized by having a controlled variable and a manpulatable variable. In the above example the temperature of the fluid is the controlled variable and the rate of heat input is the manipulatable variable. Conventional process controllers compare a measured value of the controlled variable with the desired value and issue a corrective signal proportional to the difference between said measured and desired values of the controlled signal. The corrective signal changes the value of the manipulatable variable until the measured value of the controlled variable equals the desired value. The usual effect of dead time in a system is to cause the controller to make an excessive correction or "overshoot." If the measured temperature of the fluid in the preceding pipe example falls slightly below the desired value, the controller will issue a correction signal to the heat input source to apply more heat. Because of dead time, however, the controller receives no indication that its correction, which was actually sufficient, has done any good. So it continues to apply more and more heat to the pipe as long as the measured temperature stays below the desired temperature. By the time the controller does receive an indication of a higher measured temperature, too much heat has been applied. The measured temperature will then go too high, the controller will call for less heat and this time will "under-shoot." An endless oscillation is thus established. Over-shoot may be reduced by tuning the controller for a sluggish response. This is also undesirable, because a sluggish controller cannot quickly correct a process control error, nor compensate for a rapidly changing process load.

It has been established that the ideal control system must contain a real time analog of the process under control. An article on this subject, titled "Better Controller Memory Improves Control of Difficult Processes," written by me, appeared in Control Engineering, vol. 5, No. 3 (March 1958). "Feedback Control Systems," a book by Prof. Otto J. M. Smith, published by McGraw-Hill Book Co., 1958, devotes several chapters to this subject.

Practitioners of the control art provide this real time analog of the process by building a miniature process into the controller. Pneumatic controllers use a pressure process comprised of flow restrictions, volumes and springs connected by various mechanical linkages. Electrical controllers commonly use a voltage process comprised of resistors and capacitors. These miniature processes usually have an amplitude adjustment, called proportional band (gain) adjustment, and one or two adjustable RC lags, which are used as duration adjustments. These later adjustments are called rate (derivative) and/or reset (integral) actions. This miniature process analog is often built and applied to process control without a clear understanding of the principles involved. Nevertheless, the precision of process control depends upon the precision with which the analog simulates the process. As proof of this statement, consider the fact that for good control it is often necessary to modify the process, eliminating dead time, etc., so that the process may better simulate the analog built into conventional controllers.

It is recognized by those skilled in the art that dead time, or transportation lag, is the most difficult process characteristic to simulate in a miniature analog device suitable for incorporation into a process control system. Among others, Prof. Otto J. M. Smith discusses this difficulty in an article, "A Controller To Overcome Dead Time," in the ISA Journal, vol. 6, No. 2 (February 1959).

A thermal analog, where heat flow through a heat conductive bar simulates the flow of energy or concentration through a process, offers a considerable amount of dead time. It is generally better than other analogs in this respect. However, the time constants in existing thermal analogs are fixed by the material and by the length of heat travel. Heat travels at a reasonably constant rate regardless of the magnitude of heat input. This lack of adjustment is of no consequence when the analog is used in control of a process, such as a furnace, where time constants are fixed by heat transfer considerations. It also makes no difference when the analog is used to control a fixed throughput process, such as a sieve tray distillation column which must be operated at a narrow throughput range to gain maximum efficiency.

However, a fixed time process simulation is not adequate for variable throughput processes. Consider, for instance, a gasoline dyeing operation wherein dye is injected into a flowing gasoline stream, mixed, the color detected by a colorimeter, and a signal from the colorimeter used to control dye injection. If the gasoline flow is doubled, it is obvious that the system response changes. It now takes twice as much dye to correct a given color error. The gain of this process is inversely proportional to throughput. Another effect of the doubled gasoline flow is that time constants are cut in half, also inversely proportional to process throughput. This is because the increased flow of gasoline causes greater velocity through the pipes and mixer, and results in faster response at the point of measurement. In the utilization of a conventional controller with the above gasoline dyeing process, for example, to achieve best performance the controller should be retuned each time the gasoline flow changes.

Another difficulty which is encountered with previous designs of thermal analogs is the heat flow out of the same surface of the thermal conducting bar to which the heat input is applied. Thus, at least part of the heat flow is short-circuited and never reaches the far end of the bar when the heat input varies rapidly. The thermal conducting bar is not a true process analog in such cases because the path of the controlled variable in a process usually is a one way street and once a change has been made it cannot be retracted. This is particularly true of pipe reactor processes and other processes having a considerable delay time. In the gasoline dyeing process, for example, dye injected into the gasoline cannot be recalled by merely changing the input.

I propose an improved one way heat analog of a process wherein heated fluid, such as air, is introduced into one end of a heat insulated tube and passed through a porous heat absorbing zone. The bulk filling of the heat absorbing zone can be selected to have a relatively large surface area, high heat absorbing capacity, and low heat conductivity between particles of filling. In this analog, the fluid flow is proportional to the process throughput (feed rate, etc.). This can be achieved by using fluid pressure from a flow transmitter where the transmitted pressure is proportional to the square of flow, and applying this pressure to a sharp edged restriction. Fluid passing through the restriction can be heated or cooled by passing it over a heat transfer device where heat transfer is responsive to the process controlled variable. The heated or cooled fluid flows past a first temperature sensing means, such as a resistance thermometer, and then travels through the porous heat absorbing mass. Heat is absorbed and eluted from the heat absorbing mass somewhat as molecules are absorbed and eluted in a chromatographic analyzer column. The temperature of the exit gas is sensed by a second temperature sensing means, and varies with time according to:

(a) Analog heat input rate (analogous to rate of process controlled variable), (b) Analog fluid flow rate (analogous to process throughout, feed rate, etc.), and (c) Nature and dimensions of porous fill (tailored to match nature and dimensions of the process).

Several conditions are essential if the gas flow heat analog is to be a true analog of the process at all process throughput rates and at all levels of the measured variable. A first one of the conditions is that the fluid flow rate through the analog must remain in ratio to the process throughput at all throughput rates. This requires matching the characteristics of the process throughput measuring device to those of the fluid flow throttling device in the analog. For instance, an orifice differential transmitter is compatible with the use of a sharp edged orifice flow throttling device in the analog, while a linear output flow measurement device, such as a rotameter transmitter, is compatible with a viscous flow fluid throttling device in the analog.

A second condition is that the rate of heat input to the analog must remain in preset ratio to the manipulated variable rate to the progress. This requires matching the characteristics of the analog heat input device to the process manipulated variable input device. If one is linear, the other must be linear. Examples of linear devices are thermoelectric heat transfer device, proportioning pumps, and linear control valves. If one is non-linear, the other must have the same kind of non-linearity. Examples of non-linear devices are resistive heaters (watts are proportional to square of applied voltage), equal percentage and other non-linear types of control valves, and flow through an orifice. This requirement for matching of non-linearities can be met by using characterized control valves when necessary, or by interposing various signal shaping devices in the signal path to either the analog heat input device or the manipulated process variable input device. These signal shaping devices can be, for example, squaring or square root computing devices, cam-programmed valve positioners, diode function generators, or thermistors or thyrite resistors in input circuits or as the heater in the process analog.

A third condition is that the temperature of the fluid entering the analog should not affect the analog output signal. This can be done by controlling analog inlet fluid temperature, or by providing a suitable heat sink in contact with said fluid. It can also be done by using two substantially equal multiple heat sink process analogs, absorbing heat from the fluid input to one analog and transferring this heat to the fluid input to the other analog. Differential temperature measurements are used as the output of this dual thermal analog. A convenient heat pump for a dual thermal analog is a thermoelectric cooler whose operation is based upon the Peltier effect.

The preceding illustrates permissable variations in applying the multiple heat sink process analog of the invention to process control. A variation within the scope of my invention is the use of a recirculated fluid in the thermal analog, the velocity of said fluid being caused or controlled by a signal representing process throughput.

Accordingly, an object of this invention is to provide an improved method and apparatus for controlling a process. Another object of this invention is to provide an improved method for controlling a process whereby the effect of process dead time is reduced to a minimum. A further object of this invention is to provide an improved method for controlling a process wherein a manipulatable variable is adjusted in response to a change in a controlled variable. Another object is to provide a control system for a process with dead time which system incorporates an analog of the process.

Another object is to provide a control system incorporating the advantages of ratioed input control systems.

Another object of the invention is to provide a novel and improved thermal analog of a process.

Other aspects, objects, and advantages of the invention will be apparent from a study of the disclosure, the drawings, and the appended claims.

Figure 2:
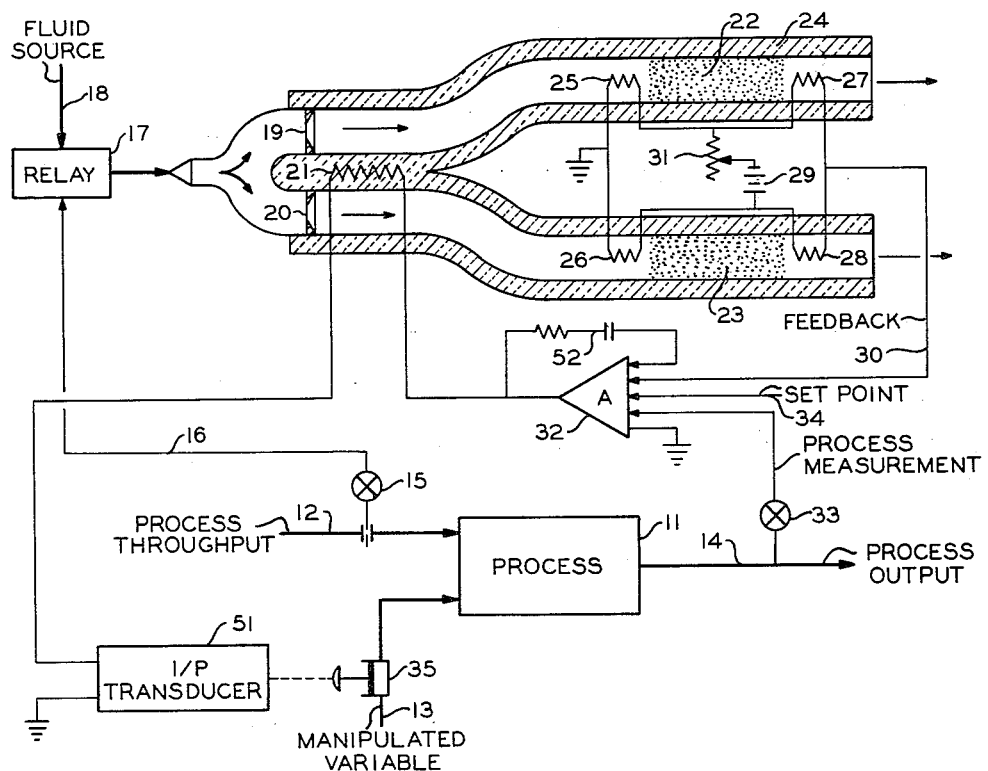
Figure 3:
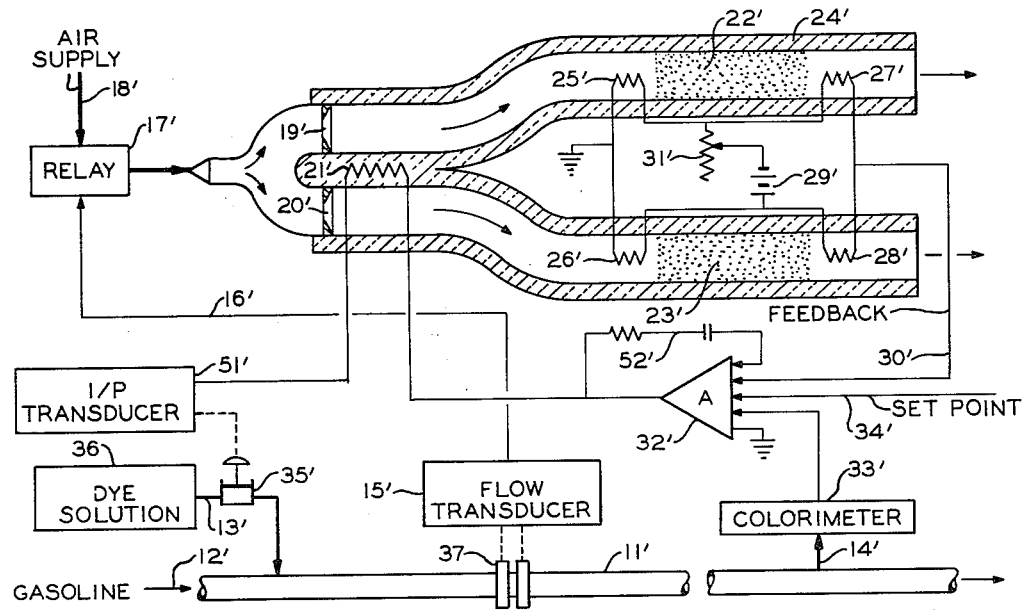
Figure 4:
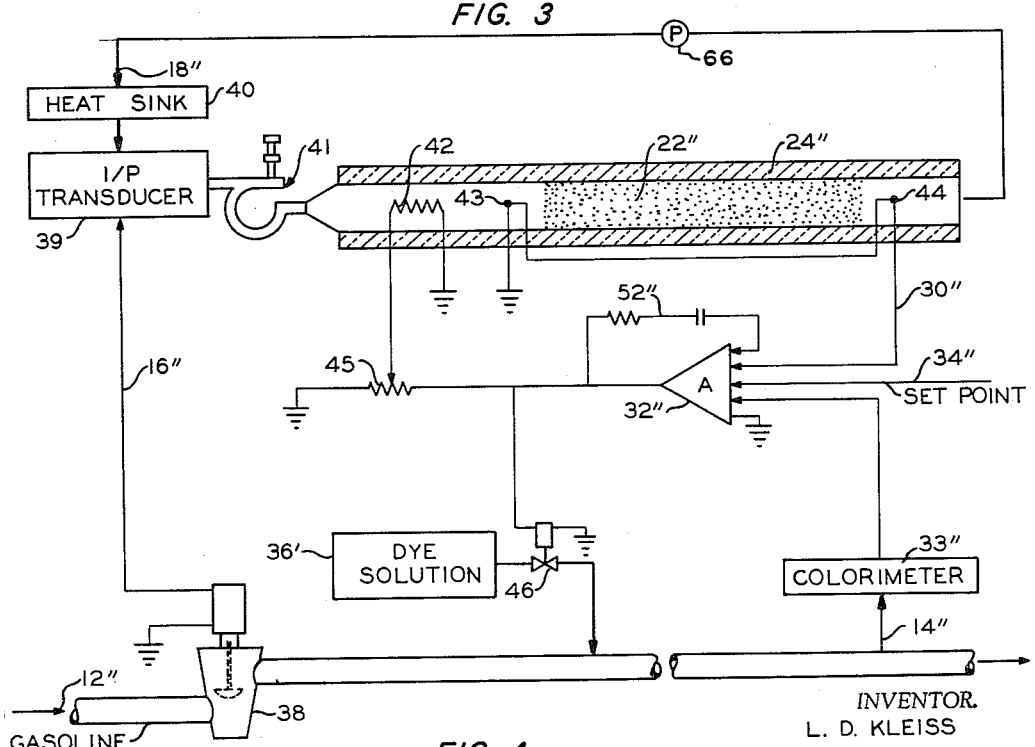

In the drawings, FIGURE 1 is a diagrammatic view of the effect of dead time plus exponential lag on a system; FIGURE 2 is a schematic representation of a process control system utilizing the novel thermal analog in accordance with the invention; FIGURE 3 is a schematic representation of a particular process utilizing a control system in accordance with the invention, and FIGURE 4 is illustrative of variations within the scope of this invention.

Referring now to the drawings and to FIGURE 2 in particular, there is shown a process 11, a process throughput variable 12, a manipulated process variable 13, and a controlled process variable 14. A single representative of the square of process throughput variable 12 is sensed by orifice flow measurement device 15 and transmitted through conduit 16 to adjustable fluid pressure regulating device 17, which can be any suitable device such as a Foxboro M56 computing relay, made by The Foxboro Co., Foxboro, Mass. Fluid pressure from source 18 is regulated by device 17 and is imposed upon sharp edged orifice restrictions 19 and 20. Orifice restrictions 19 and 20 are approximately equal. Fluid flow through these orifices is proportional to the square root of pressure drop. The downstream pressure being substantially constant, fluid flow through each orifice is thus established in ratio to process throughput variable 12, the ratio being adjustable by the gain adjustment of regulating device 17. Fluid from restrictions 19 and 20 flows in heat flow contact with opposite sides of thermoelectric device 21 so that heat is transferred from one fluid stream to the other at a rate proportional to the current flow through thermoelectric device 21. Thermoelectric devices are available commercially from the Westinghouse Corp., of Baltimore, Md. Fluid from restriction 19 flows in heat transfer relationship through a plurality of heat sinks 22. The plurality of heat sinks can be discrete heat absorbing particles, a spongy porous mass having high heat capacity and low thermal conductivity, or a relatively long length of small bore conduit. The discrete particles can be granular, spherical, saddles, rings, or any form allowing free fluid flow and having a high ratio of surface to mass. The spongy porous mass can be achieved by sintering of discrete particles, for example. The discrete particles or the porous mass can be composed of a stainless steel, Monel metal, copper, German silver, lead, dense plastics (such as those containing metallic or dense mineral fillers), heavy metal oxides, sulfides, carbides, and the like. The small bore conduit can be any extrudable material; for instance it can be dense plastic, stainless steel, Monel metal, copper, aluminum, or German silver. It is desirable that the fluid flow be turbulent while passing through the plurality of heat sinks 22, so that velocity is uniform at all points. Fluid channeling will reduce the dead time component of the analog. Fluid flow from restriction 20, after being heated or cooled by thermal contact with thermoelectric device 21 passes to and through a plurality of heat sinks 23, which heat sinks are preferably a duplicate of heat sinks 22. Fluid flow passages around thermoelectric device 21 and through multiple heat sinks 22 and 23 are encased in thermal insulation 24 to avoid heat transfer to the atmosphere.

Temperature sensitive elements 25, 26, 27, and 28 are located in heat contact with the fluid ahead of and behind multiple heat sinks 22 and 23. These elements can be platinum, nickel, iron, silicon, germanium, or thermistors, for example. In another variation of my invention, these can be thermocouples in an E.M.F. opposing series arrangement. In the present instance, these are four equal resistive elements, comprising active arms of a Wheatstone bridge. If these elements are platinum, for instance, and element 25 is heated while element 26 is cooled, with battery 29 polarity as shown, a negative E.M.F. will be impressed on feedback wire 30. This is negative feedback, as will be shown later. If element 27 is heated while element 28 is cooled, with battery 29 potential as shown, a positive potential will be impressed on feedback wire 30. This is positive feedback, as will also be shown later. The magnitude of the voltage in feedback wire 30 is adjustable by means of rheostat 31.

Amplifier 32 can be a high input impedance, high current gain amplifier. In the present instance, the output of amplifier 32 supplies power to thermoelectric device 21. A thermoelectric device requires a large current of relatively low voltage. Amplifier 32 can advantageously be a magnetic amplifier of one or more stages, but is not limited thereto. Transducer 33 can be any suitable measurement device which transmits a direct current signal to amplifier 32, the magnitude of said signal representing a measurement of the process controlled variable 14. The desired process control point, or set point, is established by impressing a direct voltage on set point input 34. This set point voltage is equal to the voltage transmitted from transducer 33 when the process is at the desired value, but is of opposite polarity. The set point voltage and the signal from transducer 33 should cancel each other at the input to amplifier 32. Any difference is known as an error signal. Current from amplifier 32 passes through thermoelectric device 21 to manipulated variable input device 35. Input device 35 can advantageously be a constant speed, variable stroke pump. Such a pump is marketed by the Milton Roy Co., Philadelphia, Pa. This pump pumps liquid at a rate which is a linear function of an applied pneumatic signal. An I/P transducer 51 is provided to match the electrical output of amplifier 32 to the required pneumatic input of device 35. This device accepts an electrical current signal and emits a pneumatic signal proportional to input current. One manufacturer supplying a suitable I/P transducer is the Honeywell Co., of Philadelphia, Pa.

The system of FIGURE 2 comprises three groups. First is the actual process 11, with its throughput variable 12, manipulated variable 13, and controlled variable 14. The next group is an analog, or mimic, of the process, comprised of items 17 through 29. This analog process has a throughput consisting of fluid flow, a manipulated variable which is the rate of heat transfer between fluid streams, and a controlled variable which is temperature difference. The analog process throughput is analogous and proportional to the throughput of the actual process; these throughputs are linked by operation of items 15 thru 20 previously described. The manipulated variable input to the analog process, which is the rate of heat transfer, is analogous and proportional to manipulated variable input to the actual process; these inputs are both responsive to amplifier output current and are linear with respect to each other. The time lags and proportional response of the analog process are identical to time lags and proportional response in the actual process. This is due to the unique heat storage and delay characteristics of multiple heat sinks in contact with a heat carrying fluid stream. Furthermore, the time lags and proportional response of the analog process are self-adjusting to those of the actual process because analog throughput and analog manipulated variable input are self-adjusting as shown above. The analog process has one feature not present in the actual process, and this is a measurement of controlled variable (temperature difference) immediately after the introduction of the manipulated variable. The third group is the amplifier with its input, output, and feedbacks. The output of a high gain amplifier is stabilized when negative feedback equals positive input. The amplifier output must assume whatever value is require to establish this stabilized condition. The positive input is set point signal 34. Negative feedback is from the process measurement tranducer 33 and from feedback 30. A conventional stabilizing feedback circuit 52 is provided to compensate for the thermal time lag in thermoelectric device 21. The RC time constant of stabilizing circuit 52 can be related to approximate the thermal lag time constant of thermoelectric device 21. These time constants are negligible when compared to the time constants of the process. Feedback from circuit 52 is of negligible duration, has zero average current flow, and will be omitted from further consideration.

The operation of this control system will now be described. A matched pair of multiple heat sink elements 22 and 23 is selected to have the same shape of response curve as the process response curve. These multiple heat sink elements can conveniently be plug-in units. At some particular process throughput the gain of relay 17 is adjusted, changing the fluid velocity through the analog, causing the duration of time constants of the analog to become equal to the duration of time constants in the process. The duration of lags is thereafter self-adjusting, because the analog fluid flow rate is self-proportioning to process throughput rate.

When the signal on set point input 34 is suddenly raised, the heat transfer rate of thermoelectric device 21 will increase. Temperature sensitive element 25 is heated, for instance, while element 26 is cooled. This unbalances the Wheatstone bridge, produces a negative feedback 30, and the amplifier is stabilized at some output current when negative feedback 30 equals the sudden change in set point 34. Gain adjustment rheostat 31 modifies the feedback signal, and stabilization can be had at any desired amplifier output current. The same current that increased heat transfer rate in the thermoelectric device also increases the value of the manipulated variable of the process, and at the same time. The heat differential between the process analog fluid streams progresses through multiple heat sinks 22 and 23 and eventually heats element 27 and cools element 28 to the same extent that elements 25 and 26 were heated and cooled sometime earlier. This rebalances the Wheatstone bridge, so that the feedback signal 30 reduces to zero. At the same time the heat differential is progressing through multiple heat sinks 22 and 23, the increase in manipulated variable 13 is progressing through process 11, suffering the same dead time and exponential lags as the analog signal. The process measurement signal from transducer 33 is also opposite in polarity to the set point signal 34, and also constitutes negative feedback around amplifier 32. The process measurement signal from measurement transducer 33 increases at the same time and to the same extent that the feedback signal 30 decreases during its return to zero. The negative feedback to the amplifier is gradually and smoothly transferred from the analog feedback 30 to the process measurement feed from transducer 33. The amplifier output remains in balance, assuming correct adjustment of gain rheostat 31. It is thus seen that the process analog and its feedback circuit constitute a predictive device which estimates a necessary change in the flow of manipulated variable and which inhibits further control action until the result of this change appears in the process output. It is also obvious that the process analog must be a true and accurate simulation of the process, reflecting changes in magnitude of response and in time constants.

A bonus of this control system is its ability to increase the flow of manipulated variable when the process throughput increases without waiting for an upset to occur. It achieves the same result as a ratioed input system, in addition to the improved dynamic control above. For instance, assume process throughput is doubled. Flow of fluid through the analog automatically doubles, changing the heating load on thermoelectric element 21. The current to the thermoelectric element must quickly double to restore the original temperature difference between temperature sensing elements 25 and 26 and rebalance the amplifier inputs. This same doubled current will also cause doubling of the supply of the manipulated variable to the process. This is the needed quantity, in view of the doubled process throughput rate.

Referring now to FIGURE 3, primed numbers refer to items having the same general functions as those identified by similar unprimed numbers in FIGURE 2. Gasoline is transmitted through pipe 11′. Dye from source 36 is injected into pipe 11′, wherein it is blended with gasoline. Colorimeter 33′ transmits an electrical signal proportional to dye concentration, and is located remotely from the dye injection point for reasons of safety and also to allow time for mixing. This blending process response curve shows predominant dead time due to transportation lag between the dye injection point and sampling point 14′. There are also exponential time lags due to mixing in the pipe and due to the response of the colorimeter. The actual response curve is determined by making a step change in dye input rate and charting the colorimeter output signal, or by calculating this curve from process dimensions and a knowledge of process dynamics. Multiple heat sinks 22′ and 23′ are selected so that their response curve closely approximates the shape of this response curve. Orifice assembly 37 measures the gasoline throughput 12′, and flow transducer 15′ is a differential pressure actuated device which transmits a pneumatic pressure signal, which over the range of 3 to 15 p.s.i. represents a squared function of gasoline flow rate. Such a transducer is marketed by the Foxboro Co., Foxboro, Mass., and others. This signal is passed through conduit 16′ to relay 17′. Relay 17′ is adjusted to subtract 3 p.s.i. from the signal from conduit 16′, and to multiply the remainder of the signal so that air flow throttled through sharp-edged restrictions 19′ and 20′ and flowing thence through multiple heat sinks 22′ and 23′ will cause the time constants of multiple heat sinks 22′ and 23′ to become equal in duration to the time constants of process 11′. Restrictions 19′ and 20′ may be changed when necessary to keep the gain adjustment of relay 17′ within reasonable limits. Once the gain of relay 17′ has been correctly adjusted, the flow of air through sinks 22′ and 23′ will remain in fixed ratio to gasoline throughput 12′ and the time constants of sinks 22′ and 23′ will be the same as those of process 11′ regardless of changes in gasoline throughput 12′.

An increase in set point 34′ will increase the current flow through thermoelectric device 21′, transferring heat from the lower air stream to the upper air stream, for example. This temperature difference is sensed by temperature sensitive elements 25′ and 26′, causing a bridge unbalance and the transmission of a negative feedback signal 30′ to amplifier 32′. The amplifier will stabilize at some current output value. This current pneumatically adjusts the stroke of variable stroke, constant speed, dye pump 35′ through the medium of I/P transducer 51′. Feedback signal 30′ is proportional to current flow through thermoelectric device 21′, inversely proportional to fluid flow rate through the process analog, and proportional to bridge voltage supplied by battery 29′ and rheostat 31′.

The bridge voltage and thus the gain of the amplifier 32′ is adjusted by means of rheostat 31′ so that negative feedback 30′ is equal to the eventual increase in signal from colorimeter 33′. This means that when the set point 34′ is raised, an increased quantity of dye sufficient to meet the net set point requirement is immediately injected into the process stream. Furthermore, if process requirements increase due to increased gasoline flow, a corresponding air flow increase in the analog will dilute the effect of the existing heat transfer rate, lessen negative feedback 30′, increase amplifier 32′ output, re-establish feedback 30′ at its original value existing before the gasoline rate increase, and increase the dye flow rate the correct amount. All this will occur without waiting for an error to show in the colorimeter measurement. Once rheostat 31′ is adjusted to a particular process, the gain of the control system is self-adjusting to any new process throughput requirement.

To continue with the operation of the gasoline blending process control system, the temperature difference progresses through multiple heat sinks 22′ and 23′, eventually reaching temperature sensitive elements 27′ and 28′. Temperature sensitive elements 27′ and 28′ produce positive feedback, and will cancel out negative feedback from elements 25′ and 26′ under steady state heat transfer conditions. At the same time and at the same rate, the increased dye concentration reaches the colorimeter 33′ through sample port 14′, and the colorimeter output signal increases exactly in phase as negative feedback is cancelled out in feedback 30.

Colorimeter 33′ can be any suitable device, such as the Series 500 Photometric Analyzer, available from Analytic Systems Co., Pasadena, Calif.

FIGURE 4 shows another embodiment of my invention applied to the same gasoline dye blending process shown in FIGURE 3. Double primed numbers refer to components having the same general functions as similarly numbered elements previously shown. The gasoline flow rate 12″ is sensed by variable area tapered flowmeter 38 which transmits an electrical signal proportional to linear flow rate. Such a flowmeter is commercially available from the Fischer-Porter Co., Hatboro, Mass. This electrical signal is passed to I/P transducer 39, which produced an output air pressure proportional to an input electrical signal. The air supply 18″ to this transducer can be temperature stabilized by passing it in heat exchanging relationship with a heat sink 40, time constant of which is substantially greater than time constants of the process. The 3 p.s.i. zero bias commonly found in pneumatic instruments is removed by calibration of I/P transducer 39, so that a zero flow of gasoline results in zero air output pressure of transducer 39. Air pressure from transducer 39 is applied to adjustable valve 41 which has a restriction shaped similar to a Bourdon tube. The degree of restriction is adjustable by a screw which changes the radius of said Bourdon tube shaped restriction. Such a valve is called a Foxboro restrictor, and is manufactured by The Foxboro Co., Foxboro, Mass. A restriction of this type features viscous flow, which is to say that flow varies linearly with pressure drop. This is in contrast to a sharp edges orifice restriction, where flow varies according to the square root of the pressure drop. Since flowmeter 38 is also a linear device, air flow through the thermal analog will remain in ratio to the gasoline throughput 12″ at all gasoline throughput rates, said ratio being adjustable by means of valve 41. Air from valve 41 is heated by resistance heater 42, which supplies heat in proportion to the square of applied voltage or current. The heated air contacts a first thermocouple 43, which supplies negative feedback 30″ to amplifier 32″. The heated air now passes through multiple heat sinks 22″, selection and function of which have previously been described. The air next contacts thermocouple 44 whose E.M.F. output constitutes positive feedback, and which is connected in series opposition to thermocouple 43. Thermocouples 43 and 44 taken together constitute differential thermocouples whose combined output is zero when both couples are at the same temperature. They can be of any common thermocouple material, and more couples can be arranged in a differential thermopile if increased voltage is desired. Feedback 30″ from thermocouples 43 and 44 establishes the gain of amplifier 32″ as previously described with respect to amplifiers 32 and 32′. The output of amplifier 32″ is passed through adjustable rheostat 45 to heater 42 and also to combination valve and valve positioner 46. The inner valve of valve and positioner 46 is positioned in response to an applied voltage or current, and the inner valve is shaped or characterized to allow dye flow as the square of its linear motion. Such a valve and positioner combination is produced and sold by the Fisher Governor Co., Marshalltown, Iowa. An inner valve with approximately this flow characteristic is the so called "equal percentage" valve. The heater 42 and the dye input valve 46 are matched because both produce an output which is ratioed to the square of amplifier 32″ output. Therefore, heat supplied the process analog will always be in ratio to dye supplied to the process, and this ratio is variable with adjustment of rheostat 45. The control system of FIGURE 4 is adjusted to the process at some particular process throughput by selecting multiple heat sinks 22″ for match with process response curve, adjusting valve 41 to match duration of time constants in the process analog to those of the process under control, and adjusting rheostat 45 so that a step change adjustment of set point 34″ will cause a step change in valve 46 sufficient to meet the new set point requirement. This implies that the effect of feedback 30″ in response to step change in set point will have the same immediate effect on amplifier 32″ as will the ultimate effect of the resulting signal change from colorimeter 33″.

The balance of the operation of this control system is the same as shown with respect to FIGURES 2 and 3.

It is within the scope of my invention to use a recirculated fluid medium in the process thermal analog in place of air. Such a medium can be helium, an aqueous solution, silicone fluid, organic fluid, or mercury, for instance. The force necessary to propel the recirculated fluid through the analog can be supplied by a positive displacement pump, turbine pump, or electromagnetic pump 66 as illustrated in FIGURE 4. Such a recirculated fluid may be advantageous because of better heat transfer characteristics. The use of a noncompressible fluid in the process analog may avoid errors encountered in throttling compressible fluids. The use of pumps to circulate fluids may be advantageous when the process throughput signal is electrical, and said electrical signal may be used to supply power directly or to control the electrical operation of said pumps.

While the control system of this invention has been illustrated with the gasoline dyeing process, this invention is suitable for use with any process having a dead time or time lag occurring in same. Another process suitable for carrying out this invention is a fractionation process wherein there is a time lag between the time of receiving the signal to change operating conditions and the time of actually effecting the desired change in the column. Still other processes to which the invention is applicable are reactor processes, catalytic cracking processes, and absorbing and stripping processes.

Reasonable variation and modification are possible within the scope of the disclosure, the drawings and the appended claims to the invention.

I claim:

1. A method for controlling a process having a manipulated process variable, a controlled process variable, and a process input variable comprising passing a stream of fluid through a heat exchange zone and then through a heat sink zone, controlling the heat transfer to said fluid in said heat exchange zone responsive to said manipulated process variable, controlling the rate of flow of said fluid responsive to said process input variable, establishing a first signal representative of the temperature of said fluid upstream of said heat sink zone and downstream of said heat exchange zone, establishing a second signal representative of the temperature of said fluid downstream of said heat sink zone, and controlling said manipulated variable responsive to said controlled process variable and said first and second signals.

2. A thermal analog device comprising a casing of thermal insulating material and having an inlet and an outlet, a fluid permeable heat sink having high heat capacity and low thermal conductivity positioned in said casing, heat exchanging means mounted in said casing between said heat sink and said inlet, first temperature sensing means positioned in said casing between said heat sink and said heat exchange means, second temperature sensing means positioned in said casing between said heat sink and said outlet, and means connected to said inlet for passing a fluid through said casing.

3. Apparatus in accordance with claim 2 wherein said fluid permeable heat sink is a body of discrete particles.

4. Apparatus in accordance with claim 2 wherein said fluid permeable heat sink is a porous body.

5. Apparatus in accordance with claim 2 wherein said fluid permeable heat sink is a relatively long conduit having a relatively small inner cross-sectional area.

6. Apparatus in accordance with claim 2 further comprising means for regulating the flow of fluid through said casing.

7. Apparatus in accordance with claim 2 wherein said first and second temperature sensing means are thermocouples.

8. Apparatus in accordance with claim 2 wherein said heat exchange means comprises a thermoelectric heater-cooler.

9. A thermal analog device comprising a casing of thermal insulating material and having an inlet and an outlet, means for dividing said casing into first and second portions, first and second fluid permeable heat sinks having high heat capacity and low thermal conductivity positioned in said first and second portions of said casing, respectively, heat exchanging means mounted in said casing between said heat sinks and said inlet to transfer heat from one of said portions to the other of said portions, first temperature sensing means positioned in said first portion of said casing between said first heat sink and said heat exchange means, second temperature sensing means positioned in said second portion of said casing between said second heat sink and said heat exchange means, third temperature sensing means positioned in said first portion between said first heat sink and said outlet, fourth temperature sensing means positioned in said second portion between said second heat sink and said outlet, and means connected to said inlet for passing a fluid through said casing.

10. A thermal analog device comprising a casing of thermal insulating material and having an inlet and an outlet, means for restricting the inner cross-sectional area of said casing adjacent said inlet, a body of discrete particles having high heat capacity and low thermal conductivity positioned in said casing and having substantially the same cross-sectional area as the inner cross-sectional area of said casing adjacent thereto, heat exchanging means mounted in said casing between said body of discrete particles and said inlet, first temperature sensing means mounted in said casing between said body of discrete particles and said heat exchanging means, second temperature sensing means positioned in said casing between said body of discrete particles and said outlet, and means connected to said inlet for passing air through said casing.

11. A control system for a process having a manipulated process variable, a controlled process variable, and a process input variable; comprising a casing of thermal insulating material and having an inlet and an outlet, a fluid permeable heat sink having high heat capacity and low thermal conductivity positioned in said casing, heat exchange means mounted in said casing between said heat sink and said inlet, first temperature sensing means mounted in said casing between said heat sink and said heat exchange means, second temperature sensing means positioned in said casing between said heat sink and said outlet, means connected to said inlet for passing a fluid through said casing, means for controlling flow of fluid through said casing responsive to said process input variable, means for controlling the heat transfer between said heat exchange means and the fluid responsive to said manipulated process variable, and means for controlling said manipulated process variable responsive to said controlled process variable and the outputs of said first and second temperature sensing means.

12. Apparatus in accordance with claim 11 wherein said means for controlling flow of fluid through said casing comprises a variable restriction.

13. Apparatus in accordance with claim 11 wherein said fluid permeable heat sink is a body of discrete particles.

14. Apparatus in accordance with claim 11 wherein said fluid permeable heat sink is a porous body.

15. Apparatus in accordance with claim 11 wherein said fluid permeable heat sink is a relatively long conduit having a relatively small inner cross-sectional area.

References Cited in the file of this patent

UNITED STATES PATENTS

| | | |
|---|---|---|
| 1,486,757 | Jensen | Mar. 11, 1924 |
| 2,416,875 | Kehoe | Mar. 14, 1947 |
| 3,031,267 | Martin | Apr. 24, 1952 |